United States Patent
Yadav et al.

(10) Patent No.: US 10,666,626 B2
(45) Date of Patent: May 26, 2020

(54) GRACEFUL HANDLING OF DYNAMIC UPDATE IN PEER ADDRESS OF SECURE COMMUNICATION SESSION

(71) Applicant: Cisco Technology, Inc., San Jose, CA (US)

(72) Inventors: Mukesh Yadav, Bangalore (IN); Navneet Priya, Bangalore (IN); Siddeshi R, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 197 days.

(21) Appl. No.: 15/408,475

(22) Filed: Jan. 18, 2017

(65) Prior Publication Data
US 2018/0205713 A1    Jul. 19, 2018

(51) Int. Cl.
*H04L 29/06*    (2006.01)
*H04L 29/12*    (2006.01)

(52) U.S. Cl.
CPC ........ *H04L 63/061* (2013.01); *H04L 63/0428* (2013.01); *H04L 63/083* (2013.01); *H04L 63/0869* (2013.01)

(58) Field of Classification Search
CPC . H04L 63/061; H04L 63/0428; H04L 63/083; H04L 63/0869; H04L 29/12386; H04L 29/12575
See application file for complete search history.

(56) References Cited

U.S. PATENT DOCUMENTS

| | | | | |
|---|---|---|---|---|
| 8,473,625 | B1 * | 6/2013 | Reeves | H04L 65/1069 709/228 |
| 2004/0139227 | A1 * | 7/2004 | Takeda | H04L 29/12066 709/245 |
| 2007/0053328 | A1 * | 3/2007 | Riittinen | H04L 63/0272 370/338 |
| 2007/0140159 | A1 * | 6/2007 | Eronen | H04L 12/12 370/328 |
| 2010/0157926 | A1 * | 6/2010 | Eronen | H04L 29/12471 370/329 |

(Continued)

FOREIGN PATENT DOCUMENTS

KR    2015044055 A  *  4/2015  ............... H04L 9/32

OTHER PUBLICATIONS

P. Eronen, Ed., "IKEv2 Mobility and Multihoming Protocol (MOBIKE)", Network Working Group, RFC 4555, Jun. 2006, 29 pages.

*Primary Examiner* — Eleni A Shiferaw
*Assistant Examiner* — Bassam A Noaman
(74) *Attorney, Agent, or Firm* — Edell, Shapiro & Finnan, LLC (57) ABSTRACT

A computing device receives one or more messages in a secure communication session with a peer device. Security information for the secure communication session includes a first network address associated with the peer device. The computing device detects that a new message in the secure communication session includes a second network address different from the first network address. The computing device validates the new message as part of the secure communication session and sends an informational request to the peer device. The informational request is sent to the peer device at a destination address of the second network address. The computing device receives an update message from the peer device.

20 Claims, 6 Drawing Sheets

(56) References Cited

U.S. PATENT DOCUMENTS

2015/0127853 A1* 5/2015 Roskind ............. H04L 61/2503
709/245
2016/0212219 A1* 7/2016 Small ................... H04L 67/143

* cited by examiner

GRACEFUL HANDLING OF DYNAMIC UPDATE IN PEER ADDRESS OF SECURE COMMUNICATION SESSION

TECHNICAL FIELD

The present disclosure relates to dynamic updates of secure communication sessions.

BACKGROUND

Communication sessions between peer computing devices can be secured and mutually authenticated by establishing and maintaining security information related to the peer device in the session. The peer devices may use Internet Key Exchange version 2 (IKEv2) as one protocol to perform mutual authentication. Each peer device establishes and saves a Security Association (SA) based on the IKEv2 exchange. Separate security associations may be used for the IKEv2 exchange and Internet Protocol Security (IPsec) encapsulated messages (e.g., Encapsulating Security Payload (ESP)) messages that are sent between the peer devices. Typically, each SA is associated with the network address (e.g., IP address/port) of the peer device, and any change in the network address of the messages in the secure communication session may cause the IPsec and/or IKEv2 connections to be torn down. For instance, the connections may be torn down if IPSec endpoints have a Network Address Translation (NAT) service in between the endpoints, and the mobility and multi-homing extension to IKEv2 (i.e., MOBIKE) support is exchanged between the two endpoints during the initial tunnel establishment. IKEv2 messages are typically used to convey control plane messages (e.g., Dead Peer Detection, Rekey, etc.), and ESP messages are used to convey data plane messages.

DESCRIPTION OF EXAMPLE EMBODIMENTS

Overview

In one embodiment, a computer-implemented method is provided for a computing device to receive one or more messages in a secure communication session with a peer device. Security information for the secure communication session includes a network address associated with the peer device. The computing device detects that a new message in the secure communication session includes a second network address different from the earlier known network address. The computing device validates the new message as part of the secure communication session and sends an information request to the peer device. The informational request is sent to the peer device at a destination address of the second network address. The computing device receives an update message from the peer device.

Detailed Description

The mobility and multi-homing extension to IKEv2 (i.e., MOBIKE) mandates that dynamic updates for MOBIKE enabled devices must not be used for updating IKEv2 SAs, but may be used for ESP packets. The techniques presented herein provide a solution for a scenario in which a MOBIKE supported payload is exchanged between two IPsec peer endpoints during the initial IKEv2 tunnel creation and Network Address Translation Traversal (NATT) was detected between the peers. In particular, the techniques resolve an issue in which the network address (e.g., IP address/port) of a peer device changes through a dynamic update.

Figure 1:
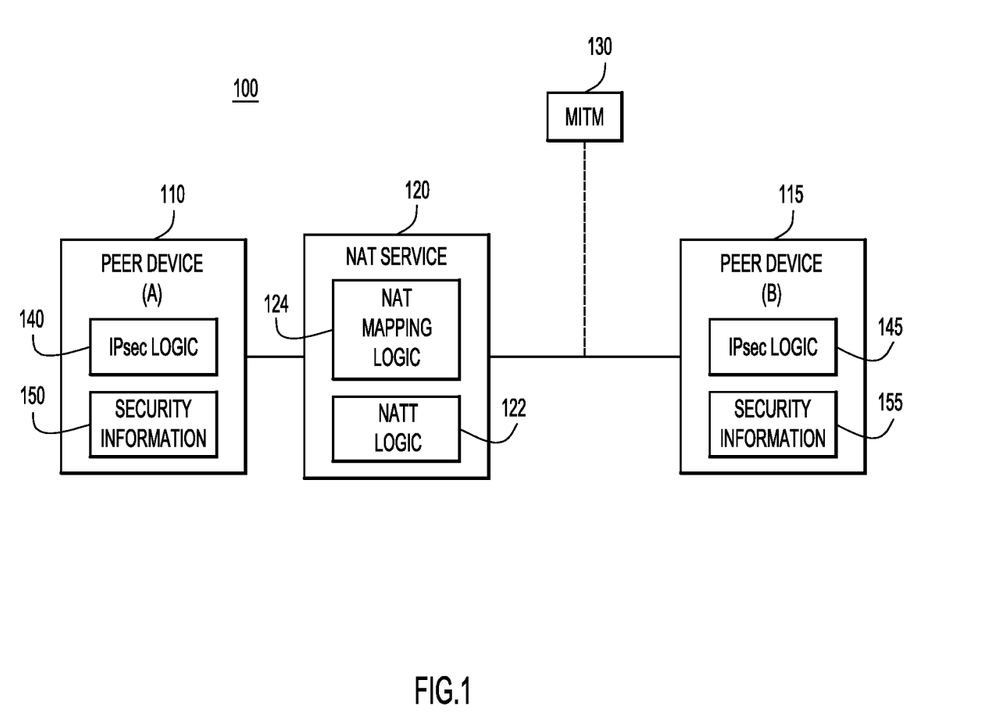
FIG. 1 is a simplified block diagram of a system to update security information of peer devices in an IPSec network with a NAT device present between end-points, according to an example embodiment.

Referring now to FIG. 1, a simplified block diagram of a secure communication system 100 is shown. Computing devices 110 and 115 are peer devices that participate in a secure communication session. The peer device 110 is behind a Network Address Translation (NAT) service 120, such that the secure communication session between the peer devices 110 and 115 traverses the NAT service 120. The NAT service 120 may also include NATT logic 122 to allow the endpoints (e.g., peer devices 110 and 115) in a secure communication session to pass information. The NAT service 120 may also include NAT mapping logic 124 to store (and potentially change) the mapping of network address translations.

The communication session is secured against a potential Man-In-The-Middle (MITM) attacker 130, which may intercept packets within the communication session. The peer devices 110 and 115 include IPsec logic 140 and 145, respectively, to secure the communication session against the MITM attacker 130. The peer devices 110 and 115 also store security information 150 and 155, respectively, in association with the secure session between the peer devices 110 and 115. In one example, the security information 150 may include one or more Security Associations (SAs) (e.g., IKEv2 SA and IPsec SA) that specifies one or more network addresses (e.g., IP address/port) associated with the peer device 115. Similarly, the security information 155 may include one or more SAs that specify one or more network addresses associated with the peer device 110.

In one example, the peer device 110 is behind NAT service 120 with NATT logic 124. This may be considered as an IPsec tunnel between peer device 110 (e.g., a user equipment device) and peer device 115 (e.g., an evolved Packet Data Gateway (ePDG), a Home evolved Node B (HeNB) gateway, or another type of subscriber mode gateway), where the IPsec mode is one-to-many (e.g., gateway-to-host instead of host-to-host). In this example, a packet in the secure communication session is initially sent from the peer device 110 to the NAT service 120 has a source address (e.g., a combination of unique IP address and port) of a first network address (e.g., A) and a destination address of a second network address (e.g., B). The NAT service 120 changes the source address of the packet to a third network address (e.g., C) so that the peer device 115 receives the packet apparently from the third network address. For instance, the packet from the peer device 110 to the NAT service 120 is labeled from address A to address B, and the packet from the NAT service 120 to the peer device 115 is labeled from address C to address B.

If the NAT service 120 changes the NAT mapping logic 124, IKEv2/ESP packets in the secure communication session arriving at the peer device 115 will be labelled with a different source address (e.g., network address K). This may be referred to as a dynamic update, in which a peer device receives an ESP packet or IKEv2 packet (which does not include an UPDATE_SA_ADDRESSES notify payload) from a source address other than the network addresses known to the receiving peer device. For instance, the network address stored in the security information 155 was initially network address C, since that is the address that the NAT service 120 provided in the initial packets. After a dynamic update, the peer device 115 receives a new packet from network address K, which is not yet associated with the peer device 110.

Dynamic updates may occur for one of several reasons:
1) The NAT mapping 124 changes (e.g., NAT service 120 reboot, NAT mapping refresh, etc.) and a new NAT mapping is allocated to the peer device 110, e.g., changing from mapping source address A to source address C to mapping source address A to source address K.
2) Peer device 110 receives a new network address and sends an update message (e.g., UPDATE_SA_ADDRESS) to peer device 115 to inform the peer device 115 of the new network address for future IKEv2/ESP messages. However, it is possible that before the peer device 110 sends the IKEv2 packet with update message, it may continue sending ESP/IKEv2 packets with the new network address. The probability of an ESP packet reaching the peer device 115 with a new address is higher than an IKEv2 packet reaching the peer device 115. The NAT service 120 will map the new network address of the peer device 110 to a different network address that the peer device 115 does not immediately associate with the peer device 110. The update message may be encrypted by the peer device 110 so that a MITM attacker 130 cannot generate a valid packet.
3) The MITM attacker 130 changes the source address of the packet after the NAT service 120. For instance, the attacker 130 may change the source address C to a false source address X.

In each of these cases, the peer device 115 receives a packet in the secure communication session from an address that the peer device 115 has not associated with the peer device 110 and must determine how to handle the packet. Initially, the peer device 115 should properly authenticate and validate the packet with the new source address. In other words, the peer device will determine if the decryption was proper and any integrity check is complete before processing the packet according to the techniques described herein to update the security information 155.

In another example, if the implementation is such that the security information 155 (e.g., the IPsec SA and the IKEv2 SA) is not updated with the new source address after a dynamic update, network traffic (e.g., ESP/IKEv2 traffic) sent from peer device 115 will not reach the peer device 110. This could lead to data loss and/or secure tunnel tear down (e.g., IKEv2 tear down), due to peer device 110 not replying to messages (e.g., Dead Peer Detection (DPD) or Rekey messages). Since the network traffic (e.g., ESP packets) are not reaching the peer device 110, the loss of data traffic may adversely impact mobility scenarios (e.g., UE/ePDG) in which the network traffic is time sensitive. For instance, a Voice over Wi-Fi® communication session uses time sensitive Transport Control Protocol (TCP) socket connections between UE devices and an Access Point Name (APN) endpoint. In this case, the recommended allowed loss of traffic is approximately three seconds in order to provide seamless voice quality.

Alternatively, if the implementation is such that only part of the security information 155 (e.g., IPsec SA) is updated with the new source address after a dynamic update, the peer device 115 may send network traffic (e.g., ESP packets) to the new network address for the peer device 110 and other network traffic (e.g., IKEv2 packets) to the original network address. In this case, the IKEv2 tunnel might be torn down due to the loss of DPD or Rekey IKEv2 packets. Additionally, ESP packets sent to the new network address may never make it to the peer device 110, since the MITM attacker 130 may have provided the new network address causing the dynamic update. This does not necessarily create a security vulnerability, since the ESP packets remain encrypted, but the data loss of packets sent to the MITM attacker 130 instead of the peer device 110 may cause the secure session to be torn down and renegotiated.

One partial solution is to have peer device 110, i.e., the peer device behind the NAT service 120 with NATT logic 122, trigger a DPD IKEv2 message with NATT payloads. This would enable the peer device 110 to identify when a dynamic update occurs based on the DPD response with NATT payload. When the peer device 110 detects the dynamic update, it will trigger an update message (e.g., UPDATE_SA_ADDRESS) to the peer device 115. The update message causes the peer device 115 to update both the IKEv2 SA and the IPsec SA in the security information 155 with the new source address associated with the peer device 110. However, this approach requires the DPD timer to be set relatively low, which is not practical in many deployments (e.g., UE/ePDG deployment) where the traffic inside ESP packets is mainly Real Time Protocol (RTP) or TCP packets with a very low timeout value. A more typical DPD timer value would be 15-60 seconds, which is far greater than the typical timeout value for RTP and/or TCP tunnel tear down (e.g., 3 seconds).

In particular, for mobility based deployments (e.g., UE/ePDG) where the IPsec mode is one-to-many and the "many" is on the order of millions of UE devices, using a very short DPD timer would put enormous stress on the network infrastructure and on the "one" peer device (e.g., the ePDG). Additionally, the processing of DPD packets (i.e., IKEv2 control traffic packets), is typically performed in a software/user space module, and using a very short DPD timer with millions of subscribers will overload the gateway.

Another partial solution would be to update the IPsec SA in the security information 155 of the peer device 115 with the new network address after the dynamic update. However, the IKEv2 SA would not be updated according to the MOBIKE specification, leaving open the possibility for the IKEv2 tunnel to be torn down when the peer device 115 sends an IKEv2 request that the peer device 110 does not receive. Additionally, a MITM attacker 130 may have caused the dynamic update by sending a packet with a new source address, which would lead the peer device 115 to send ESP packets to the wrong network address (e.g., to the MITM attacker 130).

The techniques presented herein provide a solution with two different message flows. In a first message flow, a new notify payload is defined for a notification message to be supported on both peer devices 110 and 115. The new payload provides a simple mechanism for the peer device 115 to request the peer device 110 to send an update message, and does not rely on peer device 110 detecting whether peer device 115 has received network traffic from a new network address. A second message flow scenario resolves the issue without the peer devices 110 and 115 supporting a new extension and may be preferable for one-to-many deployments where updating all of the "many" endpoints is impractical. The second message flow scenario does not require defining a new extension and uses existing packet protocols for peer device 110 to detect that peer device 115 has received network traffic with a new source address. In the second message flow scenario, only the peer device 115 (e.g., an IPsec gateway, ePDG) needs to be updated to implement the techniques described herein, and the solution does not have any dependency on the peer IPsec clients (e.g., peer device 110).

Figure 2:
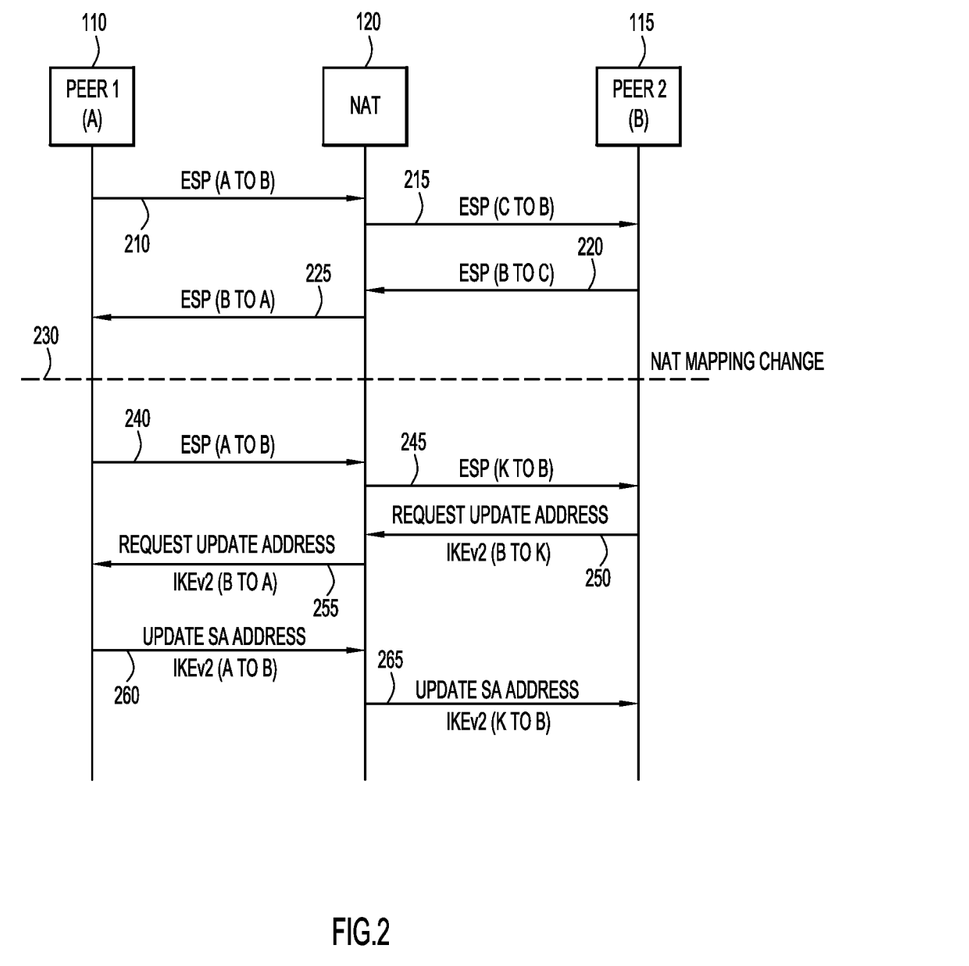
FIG. 2 is a ladder diagram illustrating messages passed between peer devices in a dynamically updated, secure communication session, according to an example embodiment based on an update request message.

Referring now to FIG. 2, a ladder diagram illustrates messages passed between peer devices 110 and 115 in a secure communication session in which one peer device is behind a NAT service 120, according to a first use case. Once the secure communication session is established (e.g., an IPsec session), the peer device 110 sends a packet 210 to the peer device 115. The packet 210 includes a header that includes a source network address (e.g., IP address/port) associated with the peer device 110 (e.g., address A) and a destination network address associated with the peer device 115 (e.g., address B). Since the peer device 110 is behind the NAT service 120, the NAT service 120 intercepts the packet 210 and forwards the payload in packet 215 with a different source address (e.g., address C), so that the packet 215 includes a source address C and a destination address B. The NAT service 120 maintains a NAT mapping that correlates the actual address of the peer device 110 (e.g., address A) with the different address (e.g., address C) that the peer device 115 associates with the peer device 110.

To communicate with the peer device 110, the peer device 115 sends a packet 220 with a source address (e.g., address B) associated with the peer device 115 and a destination address (e.g., address C) that the peer device associates with the peer device 110. The destination address sends the packet 220 to the NAT service 120, which consults a NAT mapping to determine the actual network address (e.g., address A) of the peer device 110. The NAT service 120 forwards the payload of the packet 220 to the peer device 110 in packet 225 with a source address (e.g., address B) associated with the peer device 115 and a destination address (e.g., address A) associated with the peer device 110.

At point 230, the NAT service 120 changes the NAT mapping so that the network address associated with the peer device 110 changes for devices outside of the NAT service 120. In this example, the NAT service 120 changes the NAT mapping to associate a new network address (e.g., address K) with the peer device 110 (e.g., at address A). When the peer device 110 sends a new packet 240 to the peer device 115, the NAT service 120 intercepts the packet 240. The NAT service 120 sends the payload of the packet 240 to the peer device 115 in a packet 245. The header of the packet 245 includes the new network address (e.g., address K) associated with the peer device 110 after the NAT mapping change as the source address.

When the peer device 115 receives the packet 245 with a source address (e.g., address K) that is different than the network address previously associated with peer device 110 (e.g., address C), and the peer device 115 determines that the packet 245 is authorized to be in the secure communication session with the peer device 110, the peer device must update the security information (e.g., SAs) associated with the secure communication session in order to continue securely communicating with the peer device 110. The peer device 115 responds to packet 245 with an update request 250 for the peer device 110 to send an update message according to existing protocols. The peer device 115 sends the update request 250 to the new source address (e.g., address K) from the packet 245. The NAT service 120 receives the update request 250 and forwards the payload of the update request 250 to the peer device 110 in update request 255. In other words, the NAT service 120 changes the destination address (e.g., address K) of the update request 250 to the actual network address (e.g., address A) of the peer device 110 and forwards the update request 250 as update request 255.

On receiving the update request 255 from the NAT service 120, the peer device 110 sends an update message 260 to the peer device 115. The NAT service 120 intercepts the update message 260 and changes the source address according to the new NAT mapping and forwards the update message 260 as an update message 265. After receiving the update message 265 from the NAT service 120, the peer device 115 updates the security information associated with the secure communication session according to existing protocol mechanisms. In other words, the first use case defines a new notification protocol from peer device 115, which detects the dynamic update, to the peer device 110.

In one example, the packets 210, 215, 220, 225, 240 and 245 are formatted according to an Encapsulating Security Payload (ESP) format that is secured with IPsec SAs stored at the peer devices 110 and 115. The update requests 250 and 255 may be formatted according to an IKEv2 informational exchange request sent from the peer device 115 to the peer device 110. The update requests 250 and 255 may also be referred to as a REQUEST_UPDATE_ADDRESS message with a specific format described hereinafter with respect to FIG. 3. Upon receiving the REQUEST_UPDATE_ADDRESS message 255, the peer device 110 will respond with the update message 260 including an UPDATE_SA_ADDRESS payload in an IKEv2 format. When the peer device 115 receives the UPDATE_SA_ADDRESS payload from message 265, it will update the security information (e.g., the IKEv2 SA and the IPsec SA) to reflect the new network address (e.g., address K) of the peer device 110.

In another example, in the first use case scenario that defines the update request message 250, the peer devices 110 and 110 may omit sending and processing DPD with NATT payloads, and merely use DPD without NATT payloads. Omitting the NATT payload from DPD packets reduces network usage and peer processing.

In a further example, if the peer device 115 does not receive the update message 265 (e.g., the peer device is not reachable at the new address K, the dynamic update was triggered by a MITM attacker, etc.) then the peer device 115 will ignore the dynamic update and continue attempting to communicate on the secure communication session at the original address C that was associated with the peer device 110. In this case, the peer device 115 will not update any security information (e.g., SAs) associated with the secure communication session, and will not increment a message identifier used to track messages in the secure communication session. In other words, if the peer device 115 sends an update request 250 and does not receive an update message 260 in response, the peer device 115 will continue to use the original network address associated with the peer device 110 and will not update any security information (e.g., IKEv2 SA or IPsec SA).

In yet another example, the peer device 115 may detect the dynamic update and send an update request 250 to the peer device 110 while the peer device 110 has already sent an update message (e.g., a static UPDATE_SA_ADDRESS message). In this example, the peer device 115 will receive a second update message (e.g. update message 265) soon after the initial update message. After updating the security information (e.g., IKEv2 SA and IPsec SA) in response to the initial update message, the peer device 115 may simply reprocess the second update message 265 when it is received.

In still another example, the peer device 115 may detect the dynamic update by receiving a packet from a different source address. The packet 245 triggers the update request message 250, and may be a packet in the data plane (e.g., an ESP packet) or a packet in the control plane (e.g., an IKEv2 informational request or response). If the triggering packet 245 is an ESP packet, then the peer device 115 will respond with the request message 250, and update both the IKEv2 SA and the ESP SA when the peer device 115 receives the update message 265.

If the triggering packet 245 is an IKEv2 request, the peer device 115 may respond to the IKEv2 request with an IKEv2 response before sending the update request 250 as a separate IKEv2 message. The peer device 115 will send the IKEv2 response and request message 250 to the new network address (e.g., address K), but will not update the IKEv2 SA until it receives the update message 265.

If the triggering packet 245 is an IKEv2 response to an IKEv2 request sent by the peer device 115, then the peer device will process the IKEv2 response and send the update request 250 to the new network address (e.g., address K). Once the peer device 115 receives the update message 265, it will update the security information, including both the IKEv2 SA and the IPsec SA. Receiving a data plane packet (e.g., an ESP packet) with a new source address is more likely to occur than receiving a control plane packet (e.g., an IKEv2 request/response), due to the relative volume of data packets in comparison to control packets, particularly after the secure communication session has been initialized. However, it is possible that a dynamic update will occur immediately preceding control traffic, such as a Rekey or DPD process. These examples have been provided with reference to the first use case, i.e., with an explicit update request mechanism, but may also be applied to examples in the second use case, described hereinafter with respect to FIG. 4.

Figure 3:
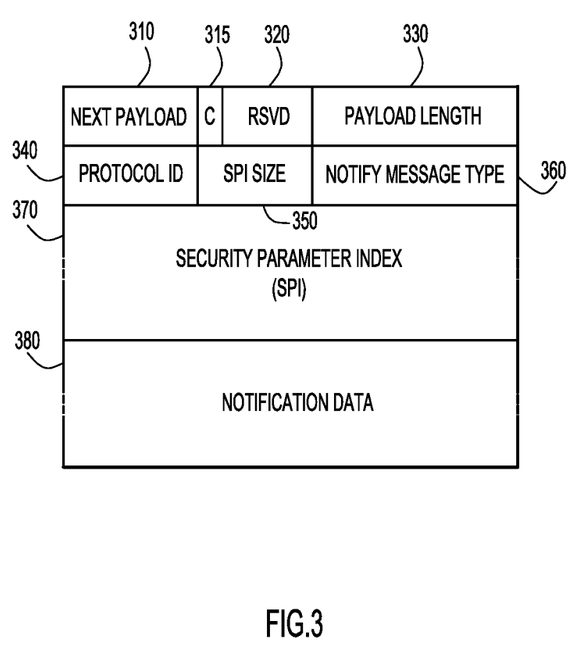
FIG. 3 is a block diagram representation of the format for an update request message, according to an example embodiment.

Referring now to FIG. 3, an example of the formatting of a Notify message type 300 used in one example of the update request message 250 defined in the first use case is shown. The Notify message format 300 for an IKEv2 informational request includes a next payload field 310, a critical bit 315, a reserved field 320, a payload length 330, a protocol ID 340, a Security Parameter Index (SPI) size field 350, a Notify message type field 360, an SPI field 370, and a Notification Data field 380. For the request message 250 used in the first use case scenario, the content of some of the fields may be simplified, since the purpose of the request message 250 is to trigger the peer device 110 to issue an UPDATE_SA_ADDRESS message. In particular, the content of the Notify Message Type field 360 may be defined with a value that has not already been claimed in the IKEv2 standard. The Protocol ID field 340 and the SPI size field 350 are both set to zero. Since there is no additional information to convey to the peer device 110, both the SPI field 370 and the Notification Data field 380 are left empty in the newly defined REQUEST_UPDATE_ADDRESS type of Notify message.

Figure 4:
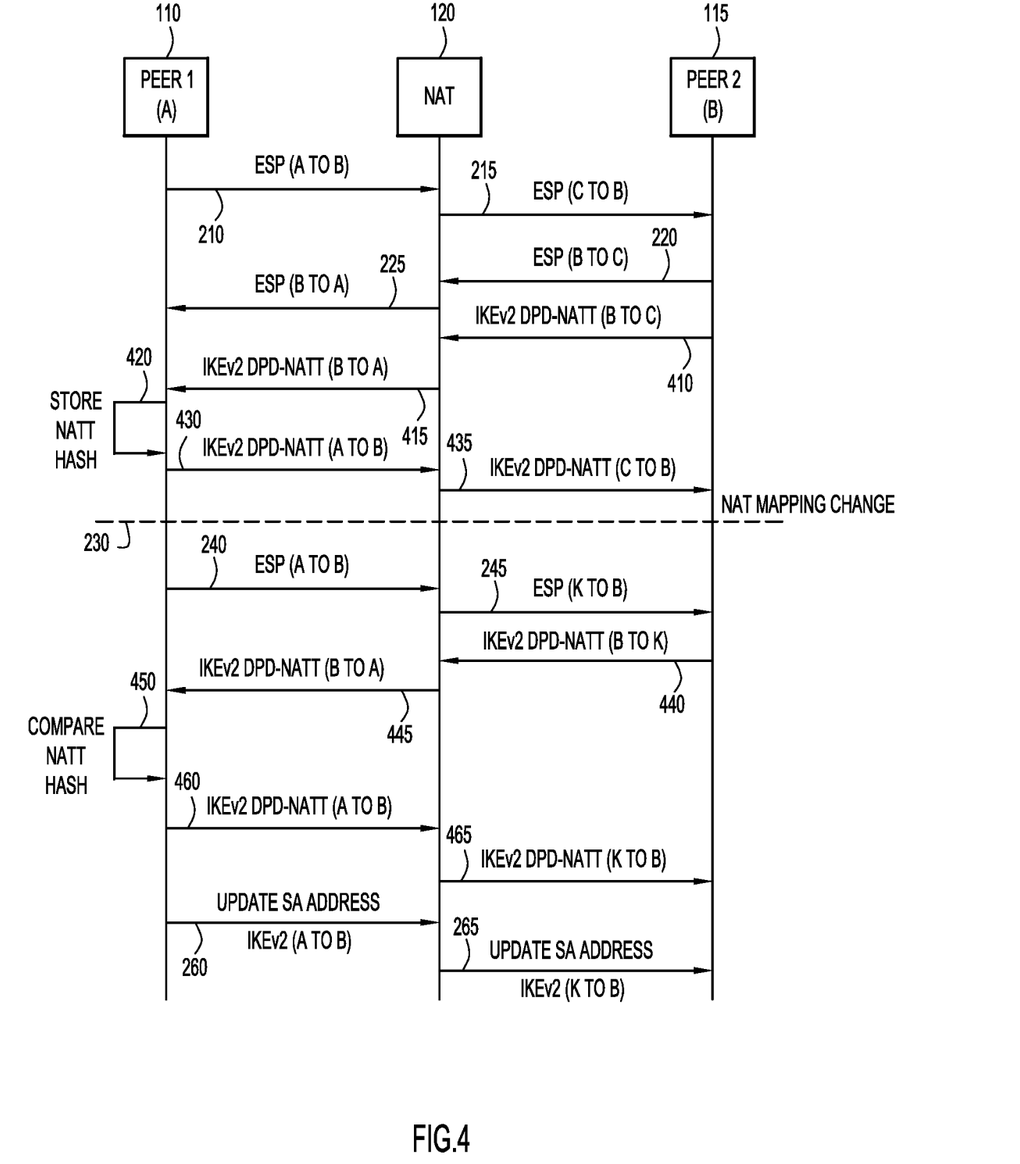
FIG. 4 is a ladder diagram illustrating messages passed between peer devices in a dynamically updated, secure communication session, according to an example embodiment based on an informational request exchange between the peer devices.

Referring now to FIG. 4, a ladder diagram illustrates messages passed between peer devices 110 and 115 in a secure communication session in which one peer device is behind a NAT service 120, according to a second use case. Similar to the first use case, once the secure communication session is established (e.g., an IPsec session), the peer device 110 sends a packet 210 to the peer device 115. The packet 210 includes a header that includes a source network address (e.g., IP address/port) associated with the peer device 110 (e.g., address A) and a destination network address associated with the peer device 115 (e.g., address B). Since the peer device 110 is behind the NAT service 120, the NAT service 120 intercepts the packet 210 and forwards the payload in packet 215 with a different source address (e.g., address C), so that the packet 215 includes a source address C and a destination address B. The NAT service 120 maintains a NAT mapping that correlates the actual address of the peer device 110 (e.g., address A) with the different address (e.g., address C) that the peer device 115 associates with the peer device 110.

To communicate with the peer device 110, the peer device 115 sends a packet 220 with a source address (e.g., address B) associated with the peer device 115 and a destination address (e.g., address C) that the peer device associates with the peer device 110. The destination address sends the packet 220 to the NAT service 120, which consults a NAT mapping to determine the actual network address (e.g., address A) of the peer device 110. The NAT service 120 forwards the payload of the packet 220 to the peer device 110 in packet 225 with a source address (e.g., address B) associated with the peer device 115 and a destination address (e.g., address A) associated with the peer device 110.

At some point in the secure communication session, the peer devices 110 and 115 perform an IKEv2 exchange with a NATT payload, such as a DPD-NATT exchange. The exchange may occur at the start of the secure communication session (e.g., in an IKE_SA_INIT exchange) allowing the peer devices 110 and 115 to detect the NAT service 120 between them in the secure session. Additionally, the peer devices 110 and 115 may perform a DPD-NATT exchange at a point in the session where the traffic in the session has lapsed for long enough that a DPD timer expires. The peer device 115 initiates the DPD exchange by sending a DPD-NATT request 410 to the network address (e.g., address C) associated with the peer device 110. The NAT service 120 translates the destination address (e.g., address C) of the DPD-NATT request 410 and forwards the DPD-NATT payload to the peer device 110 as DPD-NATT request 415.

At 420, the peer device 110 stores a cryptographic hash of the NATT payload in the DPD-NATT request 415. The NATT payload includes the network address (e.g., address C) that the peer device 115 associates with the peer device 110, enabling the peer device 110 to detect a dynamic update by detecting a change in the hash of the NATT payload. The peer device 110 completes the DPD-NATT exchange by responding with a DPD-NATT response 430. The NAT service 120 translates the source address (e.g., address A) from the response 430 to the new network address (e.g., address C) according to the new NAT mapping, and sends the DPD-NATT response 435 to the peer device 115.

At point 230, the NAT service 120 changes the NAT mapping so that the network address associated with the peer device 110 changes for devices outside of the NAT service 120. In this example, the NAT service 120 changes the NAT mapping to associate a new network address (e.g., address K) with the peer device 110 (e.g., at address A). When the peer device 110 sends a new packet 240 to the peer device 115, the NAT service 120 intercepts the packet 240. The NAT service 120 sends the payload of the packet 240 to the peer device 115 in a packet 245. The header of the packet 245 includes the new network address (e.g., address K) associated with the peer device 110 after the NAT mapping change as the source address.

The peer device 115 detects the dynamic update, which triggers a DPD-NATT exchange with the peer device 110. The peer device sends a DPD-NATT request 440 to the new network address (e.g., address K) that is the source address of the packet 245. The NAT service 120 translates the destination address (e.g., address K) of the DPD-NATT request 440 and forwards the DPD-NATT payload to the peer device 110 as DPD-NATT request 445.

At 450, the peer device 110 compares a hash of the NATT payload in the DPD-NATT payload 445 with a hash of the NATT payload stored earlier (e.g., at 420 of FIG. 4). The peer device 110 completes the DPD-NATT exchange by responding with a DPD-NATT response 460. The NAT service 120 translates the source address (e.g., address A) from the response 460 to the new network address (e.g., address K) according to the new NAT mapping, and sends the DPD-NATT response 465 to the peer device 115.

Additionally, if the peer device 110 detects that the hash of the NATT payload has changed, the peer device 110 sends an update message 260 to the peer device 115. The NAT service 120 intercepts the update message 260 and changes the source address according to the new NAT mapping and forwards the update message 260 as an update message 265. After receiving the update message 265 from the NAT service 120, the peer device 115 updates the security information associated with the secure communication session according to existing protocol mechanisms. In other words, the second use case uses existing DPD-NATT protocol messaging to enable the peer device 115 to force the peer device 110 to detect a dynamic update and issue an update message to update all of the security information according to an existing mechanism.

The second use case uses information saved from previous NATT payloads to allow the peer device 110 behind the NAT service 120 to detect a dynamic update and issue the update message. Without the previously exchanged NATT payload, the peer device 110 would not have a reference NATT payload to compare with a NATT payload that has changed after a dynamic update. In most of commercial deployments, a NATT payload will be exchanged during the initial tunnel exchange, as a way to detect the NAT service 120 between the peer devices 110 and 115.

In one example, the packets 210, 215, 220, 225, 240 and 245 are formatted according to an ESP format that is secured with IPsec SAs stored at the peer devices 110 and 115. The DPD-NATT exchange messages 410, 415, 430, 435, 440, 445, 460, and 465, and the update messages 260 and 260 may be formatted according to an IKEv2 informational exchange between the peer devices 110 and 115. Upon detecting the changed hash of the NATT payload, the peer device 110 will act by triggering the update message 260 including an UPDATE_SA_ADDRESS payload in an IKEv2 format. When the peer device 115 receives the UPDATE_SA_ADDRESS payload from message 265, it will update the security information (e.g., the IKEv2 SA and the IPsec SA) to reflect the new network address (e.g., address K) of the peer device 110.

In another example, the update message 260 may be sent as part of the payload of the DPD-NATT response 460. Alternatively, the DPD-NATT response 460 may be sent separately from the update message 260.

If the peer device 115 does not receive the update message 265 or does not receive the DPD response 465, it will continue using the original network address (e.g., address C) associated with the peer device 110 for the next packet in the secure communication session, and will not increment the message ID of the session.

In a further example, until the peer device 115 receives the update message 265, the peer device 115 may or may not use the new network address (e.g., address K) for communicating with the peer device 110. Without the update message 265, the peer device 115 does not have a requirement to update all of the security information (e.g., SAs) associated with the secure communication session.

Figure 5:
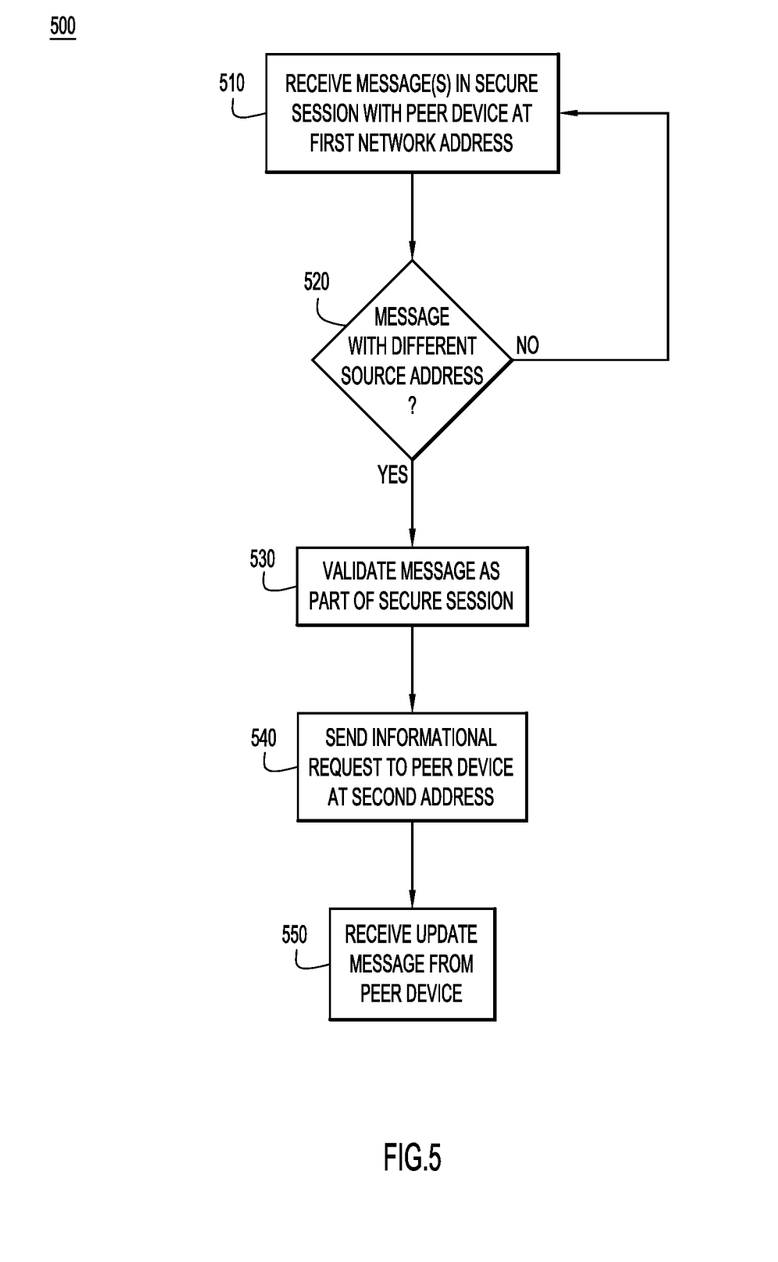
FIG. 5 is a flow chart illustrating the operations performed by one peer device in updating its security information for a secure communication session, according to an example embodiment.

Referring now to FIG. 5, a flow chart is shown that illustrates operations performed by a computing device (e.g., peer device 115) in process 500 for promptly updating security information after a dynamic update in a secure communication session with a peer device (e.g., peer device 110). In step 510, the computing device receives at least one message in a secure communication session with a peer device. The at least one message includes a first network address (e.g., an IP address/port in a header of the packet) associated with the peer device. Security information for the secure communication session is associated with the first network address. When the computing device receives a messages from a second network address, as detected in step 520, the computing device validates the message as part of the secure communication session in step 530. In other words, the computing device detects a dynamic update when it receives a message with a different source address within the secure communication session, and authenticates the message.

Once the message has been properly authenticated and validated in step 530, the computing device sends an informational request to the peer device at the second network address in step 540. The informational request may be an express request for the peer device to send an update message. Alternatively, the informational request may be an informational request according to an existing standard (e.g., DPD-NATT request) that enables the peer device to detect the dynamic update. In step 550, the computing device receives an update message from the peer device. The computing device may then update the security information and associate the second network address with the secure communication session.

In one example, the security information for the secure communication session may include an IPsec SA to secure the data plane of the session and an IKEv2 SA to secure the control plane of the session. The message with the new/second network address may be a packet in the data plane (e.g., an ESP packet) or a packet in the control plane (e.g., an IKEv2 packet). Validating the message as part of the secure communication session may comprise verifying an SPI. The SPI is an identifier secured by the IKEv2 SA. The source network address of the triggering packet may be changed (e.g., by a MITM attacker 130 or by the NAT service 120), but the SPI will remain the same in valid packets of the secure communication session.

Figure 6:
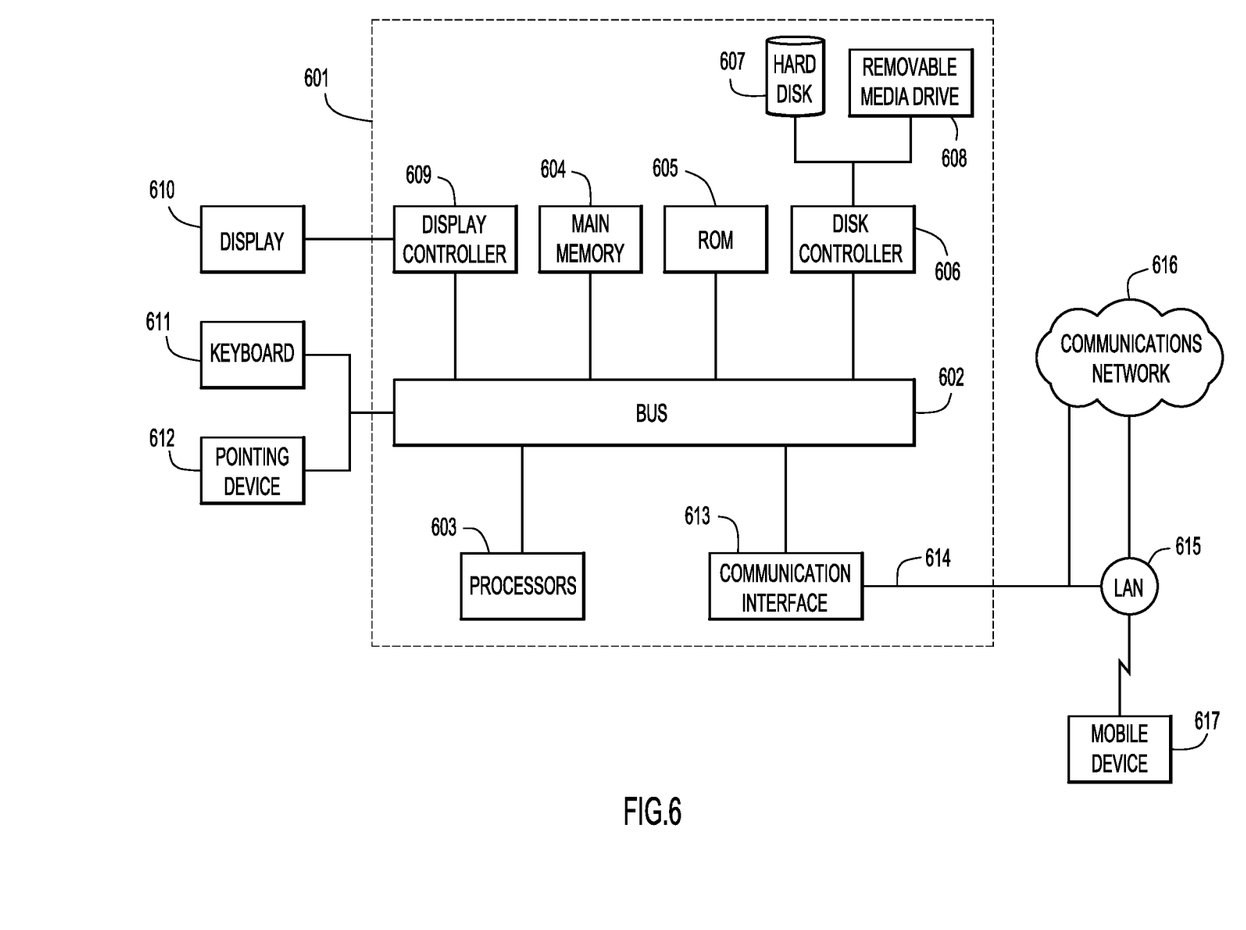
FIG. 6 is a simplified block diagram of a device that may be configured to perform methods presented herein, according to an example embodiment.

Referring now to FIG. 6, an example of a computer system 601 (e.g., peer devices 110 or 115) upon which the embodiments presented may be implemented is shown. The computer system 601 may be programmed to implement a computer based device, such as a peer device in a secure communication session. The computer system 601 includes a bus 602 or other communication mechanism for communicating information, and a processor 603 coupled with the bus 602 for processing the information. While the figure shows a single block 603 for a processor, it should be understood that the processors 603 may represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive, solid state drive, etc.). The storage devices may be added to the computer system 601 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD) or light emitting diode (LED) display, for displaying information to a computer user. The computer system 601 includes input devices, such as a keyboard 611 and a pointing device 612, for interacting with a computer user and providing information to the processor 603. The pointing device 612, for example, may be a mouse, a trackball, track pad, touch screen, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the operations presented herein in response to the processor 603 executing one or more sequences of one or more instructions contained in a memory, such as the main memory 604. Such instructions may be read into the main memory 604 from another computer readable storage medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the operations presented herein, and for enabling the computer system 601 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA), tablet computer, laptop computer, or cellular telephone.

In summary, the techniques presented herein solve a problem of tearing down existing IPsec tunnels or loss of ESP data when a dynamic update is detected on an established IPsec tunnel, particularly when the IPsec tunnel is enabled with MOBIKE protocol. The solution primarily affects applications/nodes that require real-time data flow and allow for only a short period of time for loss of service in an IPsec session. With the techniques presented herein, real-time applications using IPsec are not denied service and processing overhead will be reduced on peer devices, as well as on the network infrastructure. Applications that need time-bound data flow risk losing sessions in the event of a dynamic update without the techniques presented herein.

The techniques presented herein provide an edge over other IPsec implementations by providing for the seamless flow of data traffic by reducing the time for any data outage. These techniques may be used in any IPsec/IKEv2 deployment, but provide a distinct advantage in subscription business use cases with multiple devices requiring secure tunnels to a single gateway. For instance, an IPsec deployment in which multiple UE devices communicate with an ePDG device (i.e., non-trusted Wi-Fi attachment to Long Term Evolution (LTE) network).

The simple solution presented herein may become more relevant as more deployments adopt mobility standards (e.g., MOBIKE), since up to 80% of IPsec deployments include a NAT service. Due to the prevalence of NAT services, a MITM attacker may have an easier path to deceive a gateway (e.g., an ePDG) into believing that the NAT service has rebooted. The simple solution prevents the peer devices in the IPsec session from unnecessarily tearing down the secure tunnel due to the MITM attack.

In one form, a method is provided for a computing device to receive one or more messages in a secure communication session with a peer device. Security information for the secure communication session includes a first network address associated with the peer device. The computing device detects that a new message in the secure communication session includes a second network address different from the first network address. The computing device validates the new message as part of the secure communication session and sends an informational request to the peer device. The informational request is sent to the peer device at a destination address of the second network address. The computing device receives an update message from the peer device.

In another form, an apparatus is provided comprising a network interface and a processor. The network interface unit is configured to send and receive messages in a secure communication session with a peer device. Security information for the secure communication session includes a first network address associated with the peer device. The processor is configured to detect that a new message in the secure communication session includes a second network address different from the first network address. The processor validates the new message as part of the secure communication session, and causes the network interface unit to send an informational request to the peer device. The informational request is sent with a destination address of the second network address. The processor is configured to receive an update message from the peer device via the network interface unit.

In a further form, a non-transitory computer readable storage media is provided that is encoded with instructions that, when executed by a processor in a computing device, cause the processor to receive one or more message in a secure communication session with a peer device. Security information for the secure communication session includes a first network address associated with the peer device. The instructions further cause the processor to detect that a new message in the secure communication session includes a second network address different from the first network address. The instructions cause the processor to validate the new message as part of the secure communication session and send an informational request to the peer device. The informational request is sent with a destination address of the second network address. The instructions cause the processor to receive an update message form the peer device.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
    at a computing device, receiving one or more messages in a secure communication session with a peer device, wherein security information for the secure communication session includes a first network address that a Network Address Translation (NAT) service associates with the peer device;
    receiving at the computing device, via the NAT service, a new message in the secure communication session;
    detecting at the computing device, a NAT mapping change of the NAT service by determining that the new message includes a second network address different from the first network address,
    wherein the NAT mapping change associates the second network address with the peer device;
    validating the new message as part of the secure communication session;

sending an informational request packet with a destination address of the second network address from the computing device to the peer device via the NAT service, wherein the informational request packet prompts the peer device to update the security information through the NAT service before the NAT mapping change causes the peer device to tear down any portion of the secure communication session, enabling the peer device to maintain a time sensitive data flow to the computing device through the secure communication session; and receiving at the computing device, an update message from the peer device, wherein the update message is received before the NAT mapping change causes the computing device to tear down any portion of the secure communication session; and updating the security information for the secure communication session based on the update message, enabling the computing device to respond to the time sensitive data flow from the peer device through the secure communication session.

2. The method of claim 1, further comprising updating the security information to associate the second network address with the peer device.

3. The method of claim 2, wherein updating the security information comprises updating an Internet Protocol Security (IPsec) security association and updating an Internet Key Exchange (IKE) security association.

4. The method of claim 1, wherein the secure communication session is an Internet Protocol Security (IPsec) session, and wherein the security information includes a Security Parameter Index (SPI) used to validate the new message as part of the secure communication session.

5. The method of claim 1, wherein the informational request packet is a request for the peer device to send the update message.

6. The method of claim 1, wherein the informational request packet comprises a dead peer detection request packet including a Network Address Translation Traversal (NATT) payload.

7. The method of claim 6, further comprising receiving a dead peer detection response packet before receiving the update message.

8. An apparatus comprising:
a network interface configured to send and receive messages in a secure communication session with a peer device, wherein security information for the secure communication session includes a first network address that a Network Address Translation (NAT) service associates with the peer device; and
a hardware processor configured to:
receive via the NAT service, a new message in the secure communication session; detect a NAT mapping change of the NAT service by determining that the new message includes a second network address different from the first network address, wherein the NAT mapping change associates the second network address with the peer device;
validate the new message as part of the secure communication session;
cause the network interface to send an informational request packet with a destination address of the second network address, wherein the informational request packet prompts the peer device to update the security information through the NAT service before the NAT mapping change causes the peer device to tear down any portion of the secure communication session, enabling the peer device to maintain a time sensitive data flow to the apparatus through the secure communication session;
receive an update message from the peer device via the network interface, wherein the update message is received before the NAT mapping change causes the hardware processor to tear down any portion of the secure communication session; and update the security information for the secure communication session based on the update message; enabling the network interface to respond to the time sensitive data flow from the peer device through the secure communication session.

9. The apparatus of claim 8, wherein the hardware processor is further configured to update the security information to associate the second network address with the peer device.

10. The apparatus of claim 9, wherein the hardware processor is configured to update the security information by updating an Internet Protocol Security (IPsec) security association and updating an Internet Key Exchange (IKE) security association.

11. The apparatus of claim 8, wherein the network interface is configured to send and receive messages in the secure communication session according to an Internet Protocol Security (IPsec) session, and wherein the security information includes a Security Parameter index (SPI) used to validate the new message as part of the secure communication session.

12. The apparatus of claim 8, wherein the hardware processor is configured to cause the network interface to send the informational request packet as a request for the peer device to send the update message.

13. The apparatus of claim 8, wherein hardware processor is configured to cause the network interface to send the informational request packet including a dead peer detection request packet with a Network Address Translation Traversal (NATT) payload.

14. The apparatus of claim 13, wherein the hardware processor is further configured to receive a dead peer detection response packet via the network interface before receiving the update message.

15. One or more non-transitory computer readable storage media encoded with computer executable instructions operable to cause a hardware processor in a computing device to:
receive one or more messages in a secure communication session with a peer device, wherein security information for the secure communication session includes a first network address that a Network Address Translation (NAT) service associates with the peer device;
receive at the computing device, via the NAT service, a new message in the secure communication session;
detect a NAT mapping change of the NAT service by determining that the new message includes a second network address different from the first network address, wherein the NAT mapping change associates the second network address with the peer device;
validate the new message as part of the secure communication session;
send an informational request packet with a destination address of the second network address from the computing device to the peer device via the NAT service, wherein the informational request packet prompts the peer device to update the security information through the NAT service before the NAT mapping change causes the peer device to tear down any portion of the secure communication session, enabling the peer device to maintain a time sensitive data flow to the computing device through the secure communication session;

receive at the computing device, an update message from the peer device, wherein the update message is received before the NAT mapping change causes the hardware processor to tear down any portion of the secure communication session; and updating the security information for the secure communication session based on the update message, enabling the computing device to respond to the time sensitive data flow from the peer device through the secure communication session.

16. The computer readable storage media of claim 15, further comprising instructions operable to cause the hardware processor to update the security information to associate the second network address with the peer device.

17. The computer readable storage media of claim 16, further comprising instructions operable to cause the hardware processor to update the security information by updating an Internet Protocol Security (IPsec) security association and updating an Internet Key Exchange (IKE) security association.

18. The computer readable storage media of claim 15, wherein the informational request packet is a request for the peer device to send the update message.

19. The computer readable storage media of claim 15, wherein the informational request packet comprises a dead peer detection request packet with a Network Address Translation Traversal (NATT) payload.

20. The computer readable storage media of claim 19, further comprising instructions operable to cause the hardware processor to receive a dead peer detection response packet before receiving the update message.

* * * * *

UNITED STATES PATENT AND TRADEMARK OFFICE
CERTIFICATE OF CORRECTION

PATENT NO. : 10,666,626 B2
APPLICATION NO. : 15/408475
DATED : May 26, 2020
INVENTOR(S) : Mukesh Yadav et al.

Page 1 of 1

It is certified that error appears in the above-identified patent and that said Letters Patent is hereby corrected as shown below:

In the Claims

Claim 8, Column 16, Line 10, replace "message; enabling" with --message, enabling--

Signed and Sealed this
Seventh Day of July, 2020

Andrei Iancu
*Director of the United States Patent and Trademark Office*